United States Patent [19]

Gilliland

[11] 4,119,830

[45] Oct. 10, 1978

[54] REMOTE WELDING CONTROL SYSTEM

[76] Inventor: Malcolm T. Gilliland, 405 Dividend Dr., Peachtree City, Ga. 30269

[21] Appl. No.: 822,745

[22] Filed: Aug. 8, 1977

[51] Int. Cl.² .............................................. B23K 9/10
[52] U.S. Cl. ................................ 219/132; 219/137.71; 219/137.7
[58] Field of Search ............... 219/131 F, 131 R, 130, 219/132

[56] References Cited

U.S. PATENT DOCUMENTS

| 2,642,515 | 6/1953 | Bagg | 219/132 |
|---|---|---|---|
| 2,857,546 | 10/1958 | Lund | 219/131 F X |
| 3,180,969 | 4/1965 | Williams | 219/131 F |
| 3,213,262 | 10/1965 | Marchland | 219/131 F X |
| 3,736,403 | 5/1973 | Rogers et al. | 219/131 F |
| 3,808,397 | 4/1974 | Wixon | 219/131 R |
| 3,849,627 | 11/1974 | Blavier | 219/131 F |

FOREIGN PATENT DOCUMENTS

| 162,266 | 3/1955 | Australia | 219/131 F |
|---|---|---|---|
| 540,797 | 7/1922 | France | 219/131 F |

Primary Examiner—J. V. Truhe
Assistant Examiner—M. Paschall
Attorney, Agent, or Firm—Jones, Thomas & Askew

[57] ABSTRACT

A two conductor, nonpolarized, low voltage control cable is used in conjunction with the single conductor welding cable to achieve excellent stability of wire feed motor speed without the use of silicon controlled rectifiers or other three terminal semiconductor devices. One conductor of the control cable is used as a ground return path for the wire feed motor. The voltage across the wire feed motor is the difference between the welding power supply voltage and a second control voltage which tracks variations in the power supply voltage due to fluctuations of the AC input to the system. When greater wire feed speeds are desired, the control voltage may be driven below ground and wire feed motor speed stability is obtained by operating the motor in a region where angular velocity is relatively insensitive to incremental changes in terminal voltage. When the control cable running from the power supply control circuitry to the remote unit is severed, it may be spliced without regard to polarity by the user.

7 Claims, 2 Drawing Figures

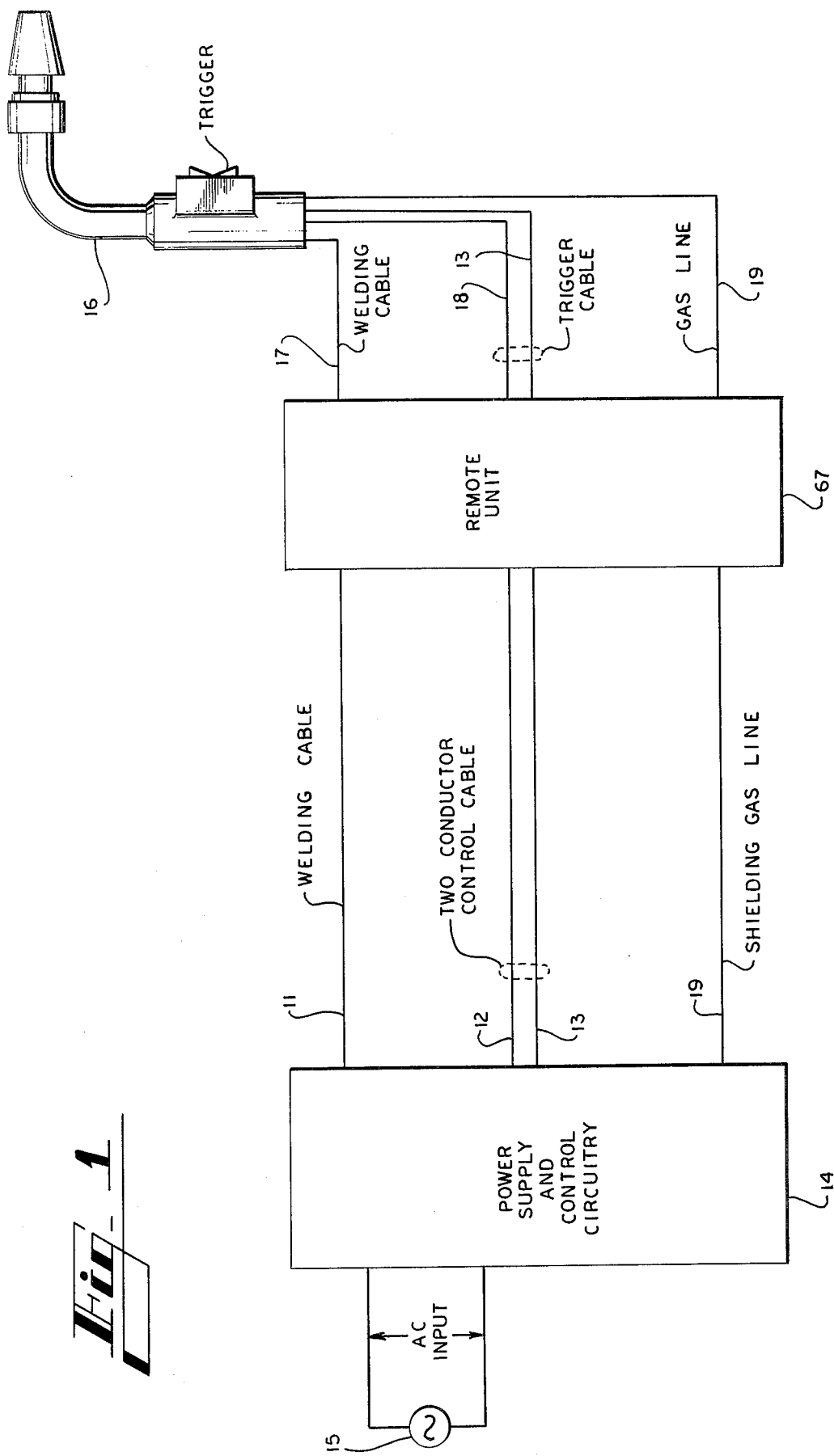

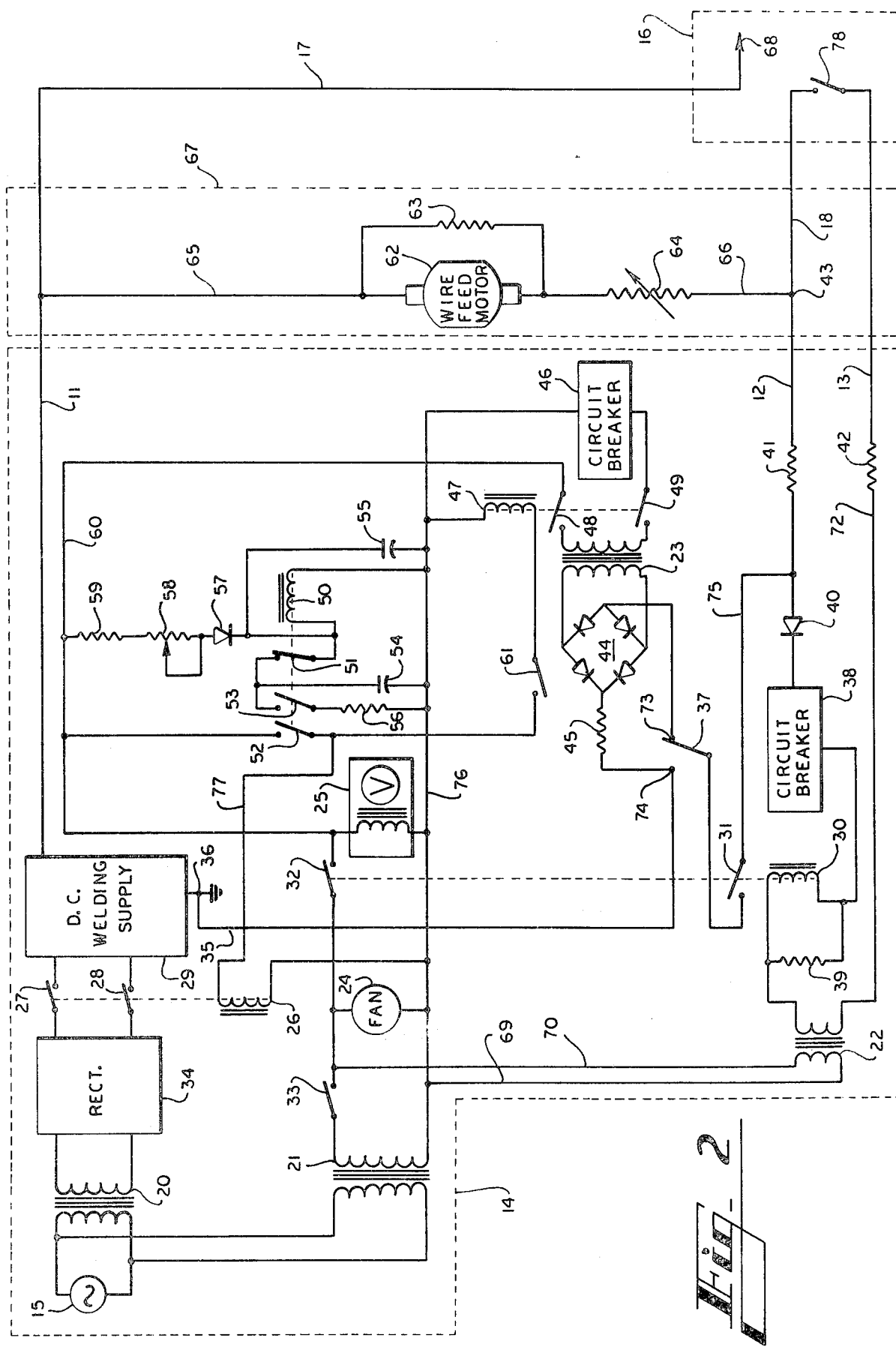

REMOTE WELDING CONTROL SYSTEM

BACKGROUND OF THE INVENTION

1. Field of Invention

The present invention relates to remote arc welding apparatus and more particularly to a simple control system having a two conductor control cable from the remote unit to the control circuitry in which good wire feed motor speed stability is obtained over a wide range of operating speeds.

2. Description of Prior Art

In remote welding systems it is desirable to minimize the number of leads between the central control and power unit and the remote unit containing the wire feeder. It is further desirable to minimize the chances that cables, once severed, will be reconnected incorrectly thus damaging the equipment.

Known art in remote welding systems has generally taken one of two approaches to the problem of controlling welding current, wire feed and shielding gas supplies at the workpiece. A remote welding system consists of multiple power supplies and remote units; one such supply and remote unit for each welder. The power supply generally has a 460 volt alternating current input and a high current DC output of about 25 volts. Between the power supply and the remote unit are the welding cable and various control cables. A major problem in remote welding systems is that in a large system such as that found at a shipyard, it is impossible to prevent a multitude of cables crisscrossing at various locations from being severed accidentally. Prior art remote welding systems have used systems to control the wire feed, weld current and shielding gas that have caused numerous problems in the presence of crossed cables and accidental cable severance.

The most common form of control in prior art welding systems uses 115 volt AC control voltages and cables with at least five conductors from the power supply to the remote unit in addition to the welding cable. When accidentally severed, these multi wire control cables expose workers to hazardous 115 volt AC voltages. Furthermore experience has taught that repair of such cables require specialized maintenance personnel and results in added expense, and large amounts of down time for the welder.

The remote units are usually 100 to 200 feet from the welding power supply and contain the wire feed motor. When remote systems using wire feed rather than stick electrodes were first introduced, the wire feed motor did not have good speed stability at the remote location. More recent systems have used silicon controlled rectifiers (SCR's) and other semiconductors to regulate the speed of the wire feed motor at the remote location. Upon accidental severance of the multiconductor control cables, short circuits in the 115 volt control system often destroy the regulating semiconductor devices causing additional expense and delay.

The multi conductor control cables of prior art remote welding systems are bulky and cumbersome for the welder to move since the welders are working one or two hundred feet from their power supplies.

Some prior art systems have overcome the problem of bulky control cables and 115 AC voltages by modulating radio frequency control signals on the welding cable. While this approach eliminates the multi conductor cable problem it creates or amplifies other problems associated with remote welding systems.

It should first be noted that a radio frequency modulation system requires sophistocated electronic components that are much more difficult to service than simpler devices such as relays. A modulation system requires some of these electronics to be located at the remote unit and the circuits are usually fabricated on printed circuit boards. Such printed circuit boards are very susceptible to damage from mechanical shocks that are often encountered at the remote locations. In a large system with many welding cables crisscrossing working areas modulation systems have been found to be susceptible to cross talk of the modulated signals. Such systems usually have a discrete frequency for each welder and his supply and in practice it has been found that spurious harmonic and intermodulation products appear on various cables thus causing some of the control circuitry to be turned on and off when the welder using it has given no such signal. When SCR control for wire feed motors are used with radio frequency modulation systems, the high noise generated by the SCRs produces further spurious responses. As is known to those skilled in the art, radio frequency modulation systems are also susceptible to spurious signals that are produced by transients that are present in a large welding system.

SUMMARY OF THE INVENTION

An object of this invention is to provide a remote welding system that can be controlled with a simple, low voltage, nonpolarized, two-conductor cable that is easy to repair and presents no hazardous voltages when it is severed.

It is a further object of this invention to provide a remote welding control system that will not damage the control circuitry when the conductors of the control cable are accidentally short circuited or grounded.

It is a further object of this invention to regulate the speed of the wire feed motor in such a manner as to not require three terminal semiconductor devices and to minimize the effect of fluctuations of the AC voltages coming into the power supply.

A further object of this invention is to provide means for increasing the voltage across the wire feed motor without increasing the potential between any point an operator can contact and the grounded workpiece. These improvements in a remote welding system are provided by a system that has the welding power supply shielding gas supply and control circuitry at one location and wire feed means and welding torch at a remote location. The supply and control circuitry are connected to the remote location by the single conductor welding cable and a two conductor control cable.

The wire feed means is operative in response to the potential difference between its terminals, neither of which is at the power supply ground potential. Control voltage means provides control voltage to the motor terminal with the lesser potential to maintain stable motor speed. When the control voltage is negative, the motor is operated in a region of its characteristics in which incremental changes in angular velocity are much smaller than in the linear region for the same incremental change in terminal potential.

The novel feature of using one conductor of the control cable as part of the ground return path for the wire feed motor allows simplicity of the control cable and simple implementation of the control voltage means.

DESCRIPTION OF THE FIGURES

FIG. 1 is a block diagram of a remote welding system embodying the present invention;

FIG. 2 is a circuit diagram of the system of FIG. 1.

DESCRIPTION OF THE PREFERRED EMBODIMENT

FIG. 1 is a block diagram of the preferred embodiment of the invention disclosed herein showing power supply and control circuitry 14 having AC input 15. From the power supply and control circuitry 14 the welding cable 11, the two conductors of the control cable 12 and 13, and the shielding gas line 19 run to the remote unit 67. The welding torch 16 is connected to remote unit 67 by a welding cable 17, conductors 13 and 18 of the trigger cable, and a continuation of shielding gas line 19.

FIG. 2 is a schematic of the preferred embodiment of the invention described herein. The sections of FIG. 2 which correspond to elements of FIG. 1 are enclosed by dashed lines and identified by the corresponding numbers.

Referring now to FIG. 2, the operation of the preferred embodiment of the invention disclosed herein and its advantages over prior art systems will be explained. AC input 15 is the high voltage AC input to the entire welding system. It is stepped down by transformer 20 and the stepped down voltage is then fed to rectifier 34. The AC input voltage is also stepped down by a transformer 21 whose secondary coil in the preferred embodiment produces about 115 volts. The closing of main power switch 33 turns on cooling fan 24 and supplies 115 volts AC along lines 69 and 70 to the primary of transformer 22. When main power switch 33 is closed the system is ready for operation. Transformer 22 is a stepdown transformer with approximately 28 volts appearing on its secondary. When trigger switch 78 is open, it can be seen that there is an open circuit loop comprising line 13, resistance 42, line 72, the secondary windings of transformer 22, the coil of relay 30 shunted by resistance 39, circuit breaker 38, diode 40, resistance 41, line 12, and line 18. No current will flow in the above described loop as long as trigger switch 78 is open. It will be obvious to those skilled in the art that diode 40 acts as a half wave rectifier and that a half wave rectified DC voltage with a value of approximately 12 volts will appear between the open terminals of trigger switch 78.

To initiate shielding gas flow, wire feed, and welding voltage at torch assembly 16, the operator closes trigger switch 78. When this switch is closed the above-described loop is closed and current begins to flow in it. The coil of relay 30 is energized thus closing its contacts 31 and 32. The closing of contact 32 energizes solenoid operated gas valve 25 thus allowing shielding gas to flow to the torch assembly. Shielding gas line 19 is represented in FIG. 1 but for simplicity's sake is omitted from FIG. 2. This allows the shielding gas to flow to the workpiece before power supply contactor relay 26 has energized DC welding supply 29. The closure of contact 32 also places 115 volts AC between lines 60 and 76. Relay 50 has yet to energize since the voltage across it is controlled by an RC timing circuit consisting of resistor 59, potentiometer 58 and capacitor 54. Capacitor 55 is considerably smaller than capacitor 54 and is only in the circuit for stability. Diode 57 allows capacitor 54 to charge when line 60 is positive with respect to line 76 and prevents discharge when the polarity is reversed. The voltage of capacitor 54 rises exponentially and at a time determined by the aforementioned RC circuit allows the coil of relay 50 to be energized. Relay 50 has three sets of contacts: 52, 53 and normally closed contacts 51. When the coil is energized normally closed contacts 51 open and contacts 53 close thus allowing capacitor 54 to discharge relatively rapidly through resistor 56 so that the circuit is reset for another cycle. The closing of contacts 52 completes a circuit along line 77 thus energizing the coil of relay 26. Relay 26 is the power supply contactor relay and closes contacts 27 and 28 thus energizing DC welding supply 29 and applying the DC welding voltage along line 11. It can thus been seen that the closing of switch 78 causes shielding gas to flow immediately while there is a delay between the time the gas begins to flow and the time the welding supply is energized.

The operation of relay 30 in response to the closing of switch 78 also closes contacts 31. Consider for a moment that switch 37 is in position 74. The closing of trigger switch 78 completes the circuit along line 18 to point 43, along line 12 through resistance 41, along line 75 to point 74 and along line 35 to the ground terminal 36 of DC welding supply 29. It will be notd that point 43 is connected to one terminal of wire feed motor 62 through variable resistance 64 and line 66. The other terminal of the wire feed motor is connected to the positive terminal of DC welding supply 29 through lines 65 and 11. Thus when trigger switch 78 is closed causing contact 31 of relay 30 to close (when switch 37 is in position 74) the wire feed motor will begin to run as soon as relay 26 energizes the DC welding supply 29. It is this use of control conductor 12 to serve as both a control line and a ground return path in the wire feed motor circuit that is one of the novel features of this invention. It will be obvious to those skilled in the art that voltage at the anode side of diode 40 will be negative with respect to line 72 in that a suitable model for this would be a DC voltage source between lines 75 and 72. It is understood by those skilled in the art that while this is half wave rectified voltage, any necessary filtering to obtain an average value will be done by the motor itself and this can be considered as a DC voltage. Resistances 41 and 42 are of a relatively small value and are the actual resistances found in lines 12 and 13 in the preferred embodiment. They may be supplied by discrete resistors located in the control circuitry at the point shown. Obviously a combination of the two could be used to obtain the desired values for said resistances. Considering the DC voltage source between lines 75 and 72, and following the loop from line 75 through contacts 31, switch 37 to point 74, along line 35 through DC welding supply 29 along lines 11 and 65 and on through wire feed motor 62; it will be apparent that the upper terminal of wire feed motor 62 will be approximately at the DC welding supply voltage and point 43 will be at a voltage which is positive with repect to welding supply ground 36. Thus the voltage drop across wire feed motor 62 is floating with respect to ground.

When the circuit is used in this configuration, one of the major advantages of this invention is obtained. Consider for a moment that the voltage of DC welding supply 29 and the voltage on the secondary coil of transformer 22 are derived from the same AC input 15. When the magnitude of this AC voltage drops, the output of DC welding supply 29 also drops as does the voltage on the secondary of transformer 22. Again considering the model of the DC voltage source between lines 75 and 72, it can be seen that there is a drop in this voltage source that is approximately proportional to the drop across the DC welding supply. The simultaneous reduction of the DC welding supply voltage which appears on line 65 and the reduction in the voltage between line 75 and 72 causes the positive voltage at point 43 to also be reduced. Thus it can be seen that fluctuations in the AC input voltage 15 cause fluctuations in the voltage appearing on line 65 and the voltage appearing at point 43. When this happens, the voltage on line 65 goes down, as does the voltage at point 43, thus tending to maintain a constant voltage across the combination of wire feed motor 62 and variable resistance 64. Therefore it can be seen that the use of line 12 in a ground return path in this control system has the added advantage of making voltage across wire feed motor relatively immune to fluctuations in the AC input to the entire system.

The voltage at point 43 can also be controlled by use of the booster circuit consisting of transformer 23, diode bridge 44 and resistance 45. Consider for a moment that switch 37 is in position 73 as shown in the drawing. In this configuration DC welding supply ground 36 is connected through line 35, resistance 45, diode bridge 44, switch 37, contact 31 to line 75. Switch 37 is called the booster bypass switch in the preferred embodiment and bypasses the booster circuit in position 74, and implements it in position 73. Switch 61 is the high/low speed switch of the booster circut; low speed being the open position as shown, and high speed being closed position.

When switch 61 is open (low speed) and the booster circuit is being used signified by switch 37 being in position 73, the loop circuit on the wire feed motor along line 12 through resistance 41 along line 75 now includes diode bridge 44 and resistance 45 in the loop before it is returned through line 35 to DC welding supply ground 36. It will be obvious to those skilled in the art that when high/low motor speed switch is in the open position, the coil of relay 47 is not energized, and thus contacts 48 and 49 do not close. Therefore secondary coil of transformer 23 "sees" an open circuit on the primary side and the diode bridge 44 can be treated simply as a passive bridge. The addition of resistance 45 and diode bridge 44 in the circuit depresses the voltage that appears at point 43. Simple superposition analysis, well known to those skilled in the art, will show that the addition of these elements loads the voltage source between lines 75 and 72. It can be seen however that the voltage at point 43 will still be positive with respect to DC welding supply ground 36 but will be of lesser magnitude than in the previously described case where the booster circuit was bypassed. Therefore the voltage drop across wire feed motor 62 is increased but the regulating effect of having a positive voltage at point 43, as previously described, is still maintained.

Consider now that high/low speed switch 61 is in its closed position and that booster bypass switch 37 is still connected to point 73 thus including the booster circuit in the wire feed motor loop. When the coil of relay 50 is energized contact 52 closes. As previously described this energizer is welding supply contactor relay 26 and with switch 61 closed it likewise energizes the coil of relay 47. This causes contacts 48 and 49 of relay 47 to close thus applying the 115 volts AC to the primary side of transformer 23. In the preferred embodiment of this invention a secondary coil of transformer 23 delivers approximately 12 volts. This voltage is rectified by a full wave rectifier diode bridge 44 and, as can be seen from the polarity of the diode bridge, produces an active drop of approximately 12 volts between points 74 and 73.

Under these conditions if we follow the loop begining with line 65 through wire feed motor 62, variable resistance 64, along line 66 to point 43, along line 12 through resistance 41 through line 75, contact 31, switch 37, diode bridge 44, resistance 45 along line 35 back to DC welding supply ground 36 through DC welding supply along line 11 it can be seen that the voltage at point 43 has been depressed considerably by the introduction of the rectified output of diode bridge 44. Recall that the voltage source model for diode 40 and transformer 22 is still present between lines 75 and 72. In the preferred embodiment of this invention, resistances 41 and 42 are on the order of tenths of ohms and resistance 45 is approximately two ohms. Thus we now have three voltage sources, the DC welding supply 29, the voltage source model for diode 40 and transformer 22, and the output of transformer 23 as rectified by diode bridge 44 all contributing to the voltage at point 43. We also have two loops, the previously described one including diode bridge 44 and the loop including diode 40, transformer 22, resistances 41 and 42, lines 12, 13 and 18, and closed switch 78. It will be obvious to those skilled in the art that, as far as the voltage at point 43 is concerned, the dominant factor in this situation will be the output of diode bridge 44 and the voltage at point 43 is thus driven below DC welding supply ground 36. The ability to achieve this reversal of polarities of point 43 is again a result of the novel feature of using line 12 as both a control conductor and the ground return path for wire feed motor 62. With the positive DC welding supply voltage appearing on line 65 and a negative voltage at point 43, it can be seen that the magnitude of the voltage across wire feed motor 62 is increased from the previously described situations.

Since the output of diode bridge 44 is derived from transformer 23 which is, as the other two voltage sources considered, dependent on AC input voltage 15 the magnitude of the negative voltage appeared at point 43 will decrease when the magnitude of AC input voltage 15 decreases. Considering that the positive DC voltage appearing on line 65 will also decrease in this instance it would appear that the previously described regulation of the voltage cross wire feed motor 62 would be lost. However in the preferred embodiment of this invention wire feed motor 62 is a permanent magnet commutator DC motor of such a type that when the voltage across it is derived from DC welding supply voltage appearing on line 65 and the negative voltage from the booster circuit appearing at point 43, it is operating in a region (under constant load) in which there is very little incremental change in angular velocity for incremental changes in voltage across its terminals. It can therefore be seen that the desired regulation of the speed of the wire feed motor is maintained when the booster circuit is being used and switch 61 is in the high speed position. It should also be noted that when the circuit is in this configuration, a greater voltage across the wire feed motor 62 is achieved without increasing the voltage potential between any point which the user could contact and DC welding supply ground 36.

When trigger switch 78 is opened, the coil of relay 30 is deenergized and contacts 31 and 32 open. It can be readily be seen that in this instance, lines 12 and 13 are electrically isolated from the rest of the system by transformer 22. It can also readily be seen that should lines 12 and 13 by served during operation of the system, it is inconsequential to the operation of the system if they are connected in a manner opposite from that in which they originally appeared.

The advantages of the invention herein disclosed may be summarized as follows. The entire welding system is controlled by a simple, nonpolarized, two conductor cable which is, when the trigger switch 78 is open, electrically isolated or floating with respect t DC welding supply ground 36. This is made possible by use of one conductor of the two conductor control cable as a ground return path from the wire feed motor. By taking advantage of the inherent resistance in the physical control cable conductors, a voltage at point 43 is raised above ground and fluctuates in the same manner as the DC welding supply voltage, thus stabilizing the voltage across the wire feed motor. When it is desired to increase the voltage across the wire feed motor, the voltage at point 43 can be driven below ground without sacrificing speed regulation by proper selection of wire feed motor characteristics and at the same time not increasing the voltage at any point in the system to system ground. This control system allows remote unit 67 to contain only the wire feed motor 62, the wire supply spool (not shown) and two resistances, 63 and 64. Thus the components contained in remote unit 15 are not those that are susceptible to damage from mechanical shocks that are often encountered in use of remote welding systems. The two conductor control cable, lines 12 and 13, present no hazardous voltages to the user, may be spliced together without regards to polarity by the user and thus prevents the need for specialized maintenance crews and long periods of down time due to accidental control cable severance. The use of the system also allows the entire welding system to be controlled by relays and passive devices without the need for SCRs or other sophistocated conductor devices.

Circuitry other than those specifically described may be employed within the scope of the present invention. Accordingly, the invention should only be limitd by the scope of the claims appended hereto.

I claim:

1. In a welding system having operating means at a first location comprising power supply circuit means for providing a ground potential, for providing a first potential with respect to said ground potential, and for providing welding current to said ground potential through a welding wire, and wire feed means at a second location responsive to a potential difference;
    connecting means consisting of a first electrical conductor at said first potential with respect to said ground potential, a second electrical conductor and a third electrical conductor for connecting said second location to said first location;
    switch means associated with said second location for connecting said second electrical conductor and said third electrical conductor;
    control voltage means for generating a substantially constant control voltage between said second electrical conductor and said third electrical conductor;
    wherein said control voltage is independent of and isolated from said ground potential and of a substantially lesser magnitude than said first potential when said second and third electrical conductors are not connected and producing a second potential with respect to said ground potential when said second and third electrical conductors are connected, and said potential difference is the difference between said first potential and said second potential.

2. The welding system of claim 1 wherein said operating means is operative in response to said connection of said second electrical conductor and said third electrical conductor.

3. The welding system of claim 1 wherein the magnitude of said control voltage is less than one-half of the magnitude of said first potential.

4. In a remote welding system having a welding cable; a welding power supply delivering welding power at a first voltage; operating means comprising a wire feed motor, shielding gas supply means, and power contactor means for connecting said welding power supply to said welding cable; a control system comprising:
    cable means comprising a first conductor and a second conductor;
    switch means selectively operable to provide an electrical connection between said first conductor and said second conductor;
    relay means operatively interconnected with said cable means responsive to said switch means for activating said operating means;
    control power supply means operatively interconnected with said cable means for providing power to said relay means at a second voltage whose magnitude is less than one-half of said first voltage in the presence of said electrical connection between said first conductor and said second conductor;
    said control power supply means being electrically isolated from said welding power supply in the absence of said electrical connection between said first conductor and said second conductor.

5. In a remote welding system having a welding power supply at a first location delivering power at a first voltage, a welding supply ground potential; a wire feed motor with a first terminal and a second terminal; a control circuit comprising:
    a first conductor operatively interconnected with at least one of said terminals of said wire feed motor;
    a second conductor;
    first switch means selectively operatable to connect said first conductor to said second conductor;
    relay switch means for connecting at least one of said terminals of said wire feed motor to said power supply ground potential through said first conductor in response to said first switch means;
    second power supply means operatively interconnected to said first conductor and said second conductor for supplying operating power to said relay switch means at a substantially constant second voltage substantially less than said first voltage;
    said second power supply means being electrically isolated from said welding power supply when said first switch means has not connected said first conductor and said second conductor.

6. In a welding system having a wire feed motor and a power supply, a control means comprising:
    control cable means having a first conductor and a second conductor;

trigger switch means selectively operable to provide a connection between said first conductor and said second conductor;

ground switch means operative in response to said connection of said first conductor and said second conductor for connecting one terminal of said wire feed motor to one terminal of said power supply through said first conductor;

wherein said first conductor and said second conductor are electrically isolated from said power supply in the absence of said connection of said first conductor and said second conductor.

7. The remote welding system of claim 5 wherein the magnitude of said second voltage is less than one-half the magnitude of said first voltage.